(12) United States Patent
Flandrinck et al.

(10) Patent No.: US 8,720,240 B2
(45) Date of Patent: May 13, 2014

(54) ARRANGEMENT FOR TRANSMITTING MOVEMENT BETWEEN, IN PARTICULAR, A VEHICLE DOOR CATCH AND LOCK

(75) Inventors: Christian Flandrinck, Creteil Cedex (FR); Anthony Guerin, Creteil Cedex (FR)

(73) Assignee: Valeo Securite Habitacle, Creteil (FR)

( * ) Notice: Subject to any disclaimer, the term of this patent is extended or adjusted under 35 U.S.C. 154(b) by 505 days.

(21) Appl. No.: 12/296,114

(22) PCT Filed: Apr. 10, 2007

(86) PCT No.: PCT/EP2007/053485
§ 371 (c)(1),
(2), (4) Date: Oct. 6, 2008

(87) PCT Pub. No.: WO2007/116073
PCT Pub. Date: Oct. 18, 2007

(65) Prior Publication Data
US 2009/0277238 A1    Nov. 12, 2009

(30) Foreign Application Priority Data
Apr. 11, 2006   (FR) ..................................... 06 51324

(51) Int. Cl.
*E05B 17/04*   (2006.01)
*E05B 9/10*    (2006.01)

(52) U.S. Cl.
USPC .............................. 70/379 R; 70/237; 70/372

(58) Field of Classification Search
USPC ............ 70/337, 367, 370, 372, 379 R, 379 A, 70/380, 237
See application file for complete search history.

(56) References Cited

U.S. PATENT DOCUMENTS

| 2,004,435 | A | * | 6/1935 | Jacobi ........................ 70/379 R |
| 3,868,836 | A | * | 3/1975 | La Roche ....................... 70/240 |
| 4,947,664 | A | * | 8/1990 | Lindmayer et al. ............. 70/422 |
| 6,415,636 | B1 | * | 7/2002 | Fukumoto et al. .............. 70/208 |

(Continued)

FOREIGN PATENT DOCUMENTS

| DE | 43 19 295 A1 | 12/1993 |
| EP | 0 943 759 A1 | 9/1999 |
| EP | 1 580 358 A  | 9/2005 |
| FR | 2 849 885 A1 | 7/2004 |

OTHER PUBLICATIONS

International Search Report from PCT/EP2007/053485 dated Jul. 12, 2007 (4 pages).
Written Opinion from PCT/EP2007/053485 (6 pages).

*Primary Examiner* — Christopher Boswell
(74) *Attorney, Agent, or Firm* — Osha Liang LLP

(57) ABSTRACT

A rotary output member that is a motor vehicle door catch and a rotary input member of a mechanism that is a motor vehicle door lock is disclosed. The arrangement includes a movement transmitting device that is inserted between the two rotary members, the transmission shaft of the two ends of which, together with the rotary output and input members, form articulated universal joints allowing some degree of axial misalignment. Each end of the shaft is ball shaped, collaborating with a complementary rotary member part. The ball at the door catch end of the transmission shaft is a faceted ball, the number of facets of which is defined according to the angle between the door catch and the door lock.

3 Claims, 2 Drawing Sheets

(56) References Cited

U.S. PATENT DOCUMENTS

| | | |
|---|---|---|
| 6,439,016 B1 * | 8/2002 | Wittwer et al. ............. 70/379 R |
| 6,837,083 B2 * | 1/2005 | Katagiri et al. ............. 70/379 R |
| 6,938,446 B2 * | 9/2005 | Fukunaga et al. ............. 70/237 |
| 7,137,280 B2 * | 11/2006 | Capka et al. .................... 70/492 |
| 7,536,887 B2 * | 5/2009 | Makino ....................... 70/379 R |
| 8,262,143 B2 * | 9/2012 | Giacomin .................. 292/336.3 |
| 2002/0184931 A1 * | 12/2002 | Wittwer .......................... 70/237 |
| 2009/0314045 A1 * | 12/2009 | Giacomin et al. .............. 70/237 |

\* cited by examiner

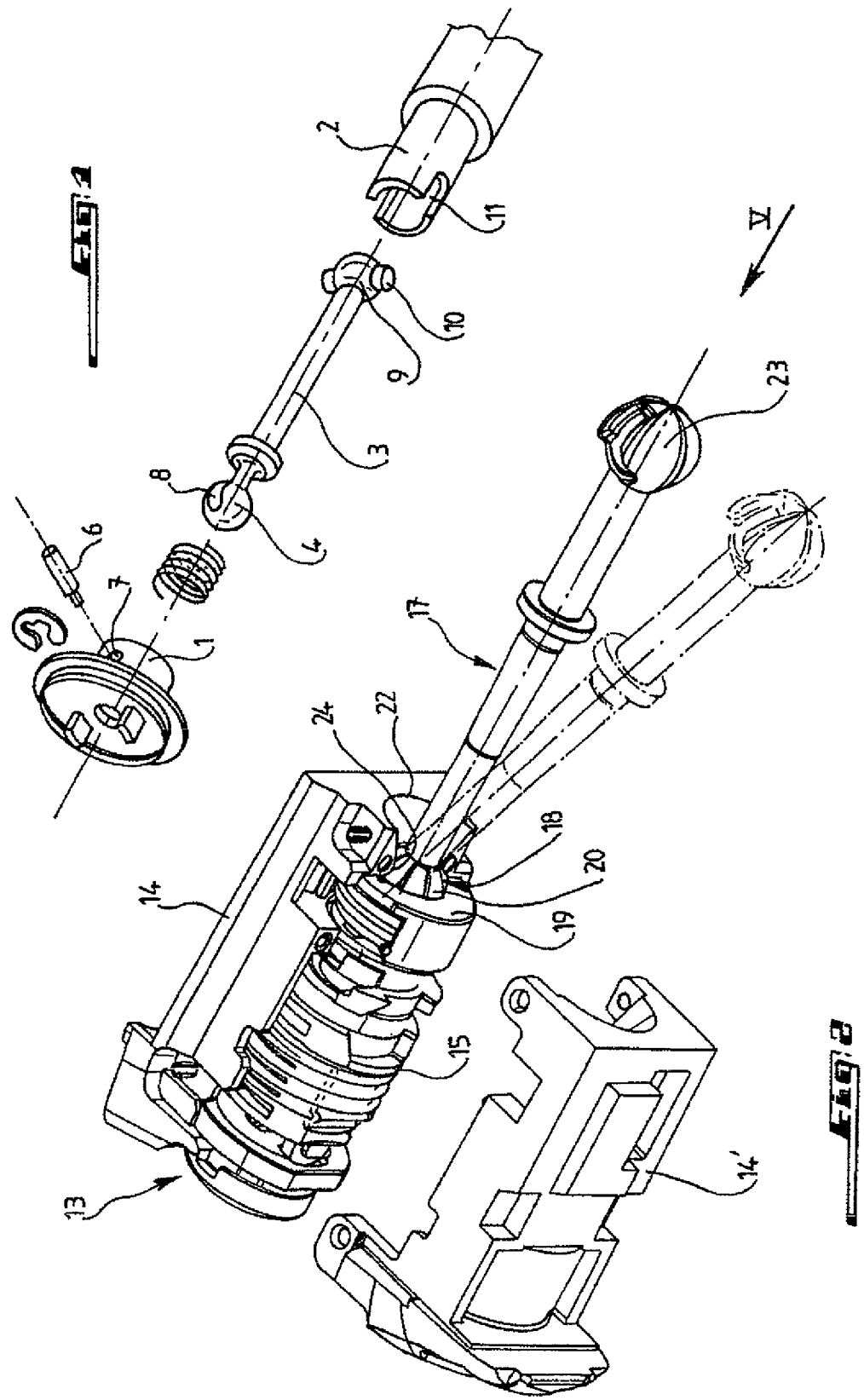

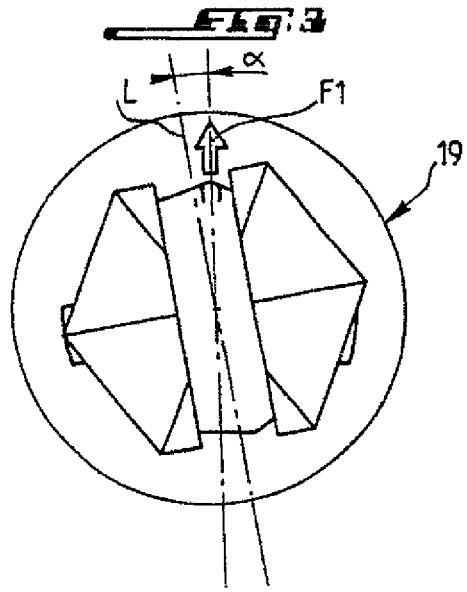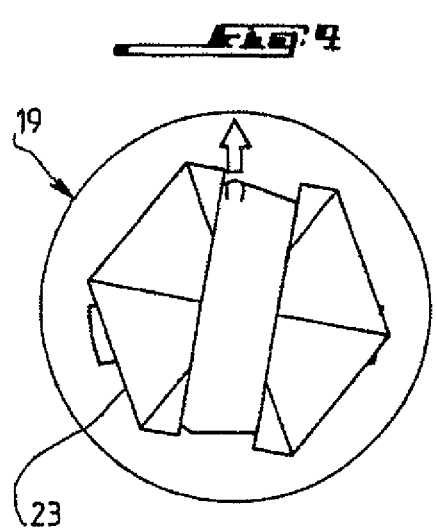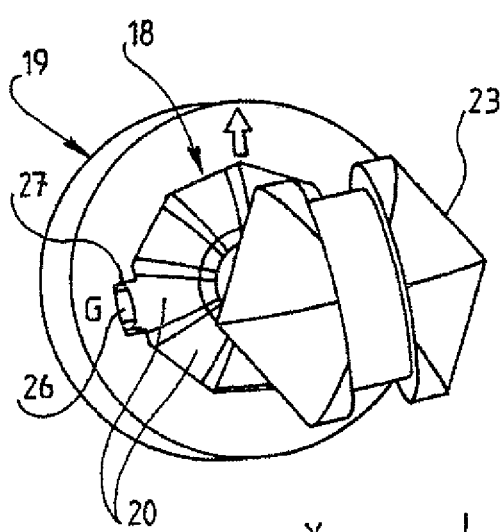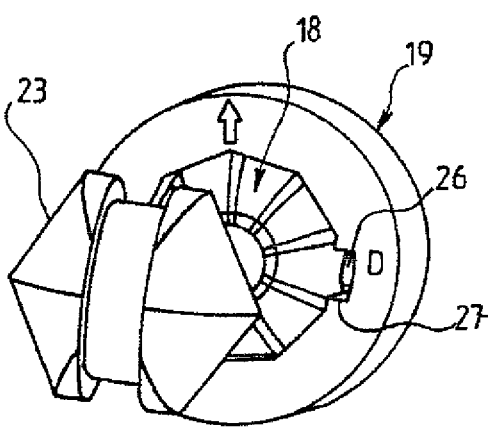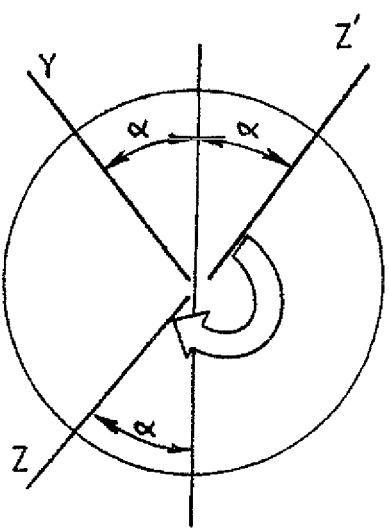

ARRANGEMENT FOR TRANSMITTING MOVEMENT BETWEEN, IN PARTICULAR, A VEHICLE DOOR CATCH AND LOCK

The invention relates to an arrangement for transmitting movement between a rotary output member such as a motor vehicle door catch and a rotary input member of a mechanism such as a motor vehicle door lock, of the type comprising a movement transmission device inserted between the two rotary members and comprising a transmission shaft the two ends of which, together with the rotary input and output members, constitute articulated transmission joints that allow for some degree of axial misalignment, each end having the overall shape of a ball collaborating with a complementary rotary member part.

A transmission arrangement of this type is known from European Patent EP 0943759. FIG. 1 depicts that part of the arrangement that is of interest in the context of the invention. In this figure, the rotary output member is denoted by the reference 1, the rotary input member of the lock mechanism is denoted by the reference 2 and the shaft that transmits the movement of the output member 1 to the input member 2 is denoted by the reference 3. The end 4 of the shaft 2, which is intended to fit into the rotary output member 2, is held in the member 1 by a cylindrical hinge pin 6 that passes through a radial orifice 7 in the member 1 and a diametral slot 8 that narrows on each side of the periphery toward the center. The other end of the transmission shaft 3 also has a head of spherical overall shape 9 provided with two diametrically projecting tenons 10 intended to fit into complementary axial slots 11 belonging to the input member 2 of the lock mechanism.

This known arrangement has the disadvantage of having a relatively complicated structure and, above all, of requiring, in order to establish the pivoting joint between the output member 1 and the transmission shaft 3, a separate component, namely the pin 6, which in addition entails an additional assembly operation. What is more, this known arrangement requires two different transmission shafts, one for the left door and one for the right.

It is an object of the invention to propose an arrangement that alleviates the disadvantages that have just been described.

To achieve this objective, the arrangement according to the invention is characterized in that at least the catch end shaped end of the movement transmission device is a faceted ball the number of facets of which is defined according to the angle between the catch and the lock.

According to one feature of the invention, the arrangement according to the invention comprises means allowing the same arrangement to be used for both the right and left doors of the vehicle.

According to another feature of the invention, this means lies in the choice of the number of facets.

The invention will be better understood, and other objects, features, details and advantages thereof will become more clearly apparent, in the following explanatory description given with reference to the schematic attached drawings provided solely by way of illustrative example of one embodiment of the invention and in which:

FIG. 1 is a schematic perspective view of an arrangement for transmitting movement between a motor vehicle door lock and catch according to the prior art;

FIG. 2 is a perspective view of an arrangement according to the invention, omitting the lock part;

FIGS. 3 and 4 are schematic views illustrating the universal ball joint at the lock end with respect to the catch for the left door and the right door respectively, FIGS. 5 and 6 are perspective views of the arrangement according to the invention, viewed in the direction of the arrow V of FIG. 2, for the left door and right door respectively, FIG. 7 is a schematic view illustrating how the number of facets of a faceted ball-type universal joint according to the invention is calculated.

In FIG. 2, which illustrates an arrangement for transmitting movement between a motor vehicle door catch and lock according to the invention, the reference 13 denotes a catch mechanism comprising a stator made in two assemblable parts 14, 14' and a bowl assembly 15, and the reference 17 denotes the shaft transmitting the movements from the catch to the lock (not depicted). The two ends of the shaft 17 that are intended to collaborate with the catch and with the lock are produced in the form of faceted balls 18, 23, respectively, the catch-end ball 18 constituting a universal joint ball fitted into a ball joint end fitting 19 of complementary shape.

According to another feature of the invention, the faceted universal joint 18 is configured such that only two assembly positions are allowed, so as to avoid any risk of assembly error. The foolproofing device provided for this purpose comprises, in the example depicted, a tenon or stud 26 projecting from one facet 20 of the universal-joint ball and two appropriate slots 27 in the, likewise faceted, internal face of the universal ball joint end fitting slots 19, the stud being intended to fit into one or other of the two slots. FIGS. 5 and 6 illustrate how one and the same transmission arrangement according to the invention is mounted on a left door or on a right door, as indicated by the letters G and D respectively.

One way of establishing the number of facets on the universal joint 18 in order to obtain both the desired angle $\alpha$ between the catch and the lock and to be able to use the same arrangement on the right door and the left door of the vehicle is described hereinbelow with reference to FIG. 7. The lines Y and Z' in FIG. 7 respectively illustrate the positions "catch-to-the-right" and "catch-to-the-left". To ensure this common usage, the line Z' is extended across the diameter to give the line Z which, with the vertical line, likewise delimits the angle $\alpha$. The following relationship is obtained for the number of facets C between the two lines Y and Z, to the left of the vertical line, and the angle A of a facet:

$$180 - 2\alpha = C \times A$$

If the number of facets on the other side is termed B and the total number of facets is termed N, then the following system of equations can be written:

$$180 - 2\alpha = C \times A$$

$$N = C + B$$

$$N \times A = 360°$$

$$B > C$$

N, C and B being integers with N as small as possible.

By way of example, by applying these equations, for an angle $\alpha = 10°$ dictated by the vehicle, the values C=4, A=40°, B=5 and N=9 can be obtained.

It is evident from the foregoing description that the invention makes it possible to produce just one universal joint that can be used for both left doors and right doors, making it possible to dispense with additional components as shown by a comparison between FIG. 2 and FIG. 1 that illustrates the prior art.

The invention has been described hereinabove by way of example in its application to motor vehicles. However, the invention can be used in all instances where the problem corresponds to the one that has just been addressed in relation to motor vehicles.

The invention claimed is:

1. An arrangement for transmitting movement between a rotary output member, wherein the rotary output member is a motor vehicle door catch and a rotary input member, wherein the rotary input member is a motor vehicle door lock, comprising:
 a movement transmission device inserted between the rotary input and output members, wherein the movement transmission device comprises a transmission shaft including two ends which, together with the rotary input and output members, constitute articulated transmission joints that allow for some degree of axial misalignment,
 wherein each of the two ends are in a shape of a ball collaborating with a complementary rotary member part,
 wherein at least one of the balls at the door catch end of the transmission shaft is a faceted ball, wherein a number of facets of the faceted ball is defined according to an angle ($\alpha$) between the door catch and the door lock,
 wherein the movement transmission device is used for both a right and a left door of the motor vehicle, and
 wherein the use of the movement transmission device for both the right and the left door is facilitated by a choice of the number of facets of the faceted ball.

2. An arrangement for transmitting movement between a rotary output member, wherein the rotary output member is a motor vehicle door catch and a rotary input member, wherein the rotary input member is a motor vehicle door lock, comprising:
 a movement transmission device inserted between the rotary input and output members, wherein the movement transmission device comprises a transmission shaft including two ends which, together with the rotary input and output members, constitute articulated transmission joints that allow for some degree of axial misalignment,
 wherein each of the two ends are in a shape of a ball collaborating with a complementary rotary member part,
 wherein at least one of the balls at the door catch end of the transmission shaft is a faceted ball, wherein a number of facets of the faceted ball is defined according to an angle ($\alpha$) between the door catch and the door lock, and
 wherein the number of facets N that the faceted ball comprises is determined according to a system of equations comprising:

$$180-2\alpha = C \times A;$$

$$N = C + B;$$

$$N \times A = 360'; \text{ and}$$

$$B > C,$$

in which C is the number of facets in the angular portion $2\alpha$, B is the number of facets that complements C, A is the angle of a facet, $\alpha$ is the angle between the catch and the lock, and wherein N, C, and B are integers.

3. An arrangement for transmitting movement between a rotary output member, wherein the rotary output member is a motor vehicle door catch and a rotary input member, wherein the rotary input member is a motor vehicle door lock, comprising:
 a movement transmission device inserted between the rotary input and output members, wherein the movement transmission device comprises a transmission shaft including two ends which, together with the rotary input and output members, constitute articulated transmission joints that allow for some degree of axial misalignment,
 wherein each of the two ends are in a shape of a ball collaborating with a complementary rotary member part,
 wherein at least one of the balls at the door catch end of the transmission shaft is a faceted ball, wherein a number of facets of the faceted ball is defined according to an angle ($\alpha$) between the door catch and the door lock,
 wherein the movement transmission device is used for both a right and a left door of the motor vehicle, and
 wherein the number of facets is determined according to the use of the movement transmission device for both the right and the left door.

* * * * *